United States Patent Office 3,761,445
Patented Sept. 25, 1973

3,761,445
PROCESS FOR THE PREPARATION OF MOLD-
ING POWDERS OF HEAT-STABLE ANHYDRIDE
POLYCONDENSATES
Maurice Balme, Sainte-Foy-Les-Lyon, and Maurice
Ducloux, Irigny, France, assignors to Rhone-Poulenc
S.A., Paris, France
No Drawing. Filed Jan. 22, 1971, Ser. No. 109,041
Claims priority, application France, Jan. 26, 1970,
7002648
Int. Cl. C08g 20/30, 20/32, 33/02
U.S. Cl. 260—47 CP                                   8 Claims

ABSTRACT OF THE DISCLOSURE

Moulding powders obtained by heating an azophthalic anhydride/mono- or poly-hydroxyaromatic compound pre-polycondensate with a diprimary aromatic diamine in an orthophosphate of the formula:

$$O=P\begin{matrix}OAr_1\\OAr_2\\OR_2\end{matrix}$$

in which the symbols $Ar_1$ and $Ar_2$, which may be identical or different, represent a phenyl, tolyl or xylyl radical and the symbol $R_2$ represents an alkyl or chloroalkyl radical having 1 to 8 carbon atoms or one of the radicals represented by $Ar_1$ and $Ar_2$, as diluent.

---

This invention relates to heat-stable polycondensates suitable as moulding powders.

In French Pat. No. 1,540,984 there are described polycondensates obtained by heating monohydroxyaromatic or polyhydroxyaromatic compounds with dianhydrides of formula:

[Structure I: bis(phthalic anhydride) with bridging group R] (I)

in which R represents a single bond or divalent radical of the formula:

—O—, —S—, —SO$_2$—, —NH—, —N—, —N=N—,
                               |        ↓
                               R        O

—Si(R')$_2$—, —N=N—, —OSi(R')$_3$—, —OP(R')O—,
                                            ‖
                                            O

—P(R')—, —CHOH—, —C— and —C(CH$_3$)$_2$—,
                  ‖
                  O where R' represents a lower alkyl, cycloalkyl or aryl radical.

These polycondensates are obtained by heating the mixture, the phenolic compound being used in an amount greater than 0.5 mol per mol of dianhydride, preferably in the presence of a solvent capable of forming a binary azeotrope with the water formed during the reaction, such as benzene.

To produce moulded or laminated articles it is stated to be convenient to carry out the process in two stages; in a first stage, a pre-polycondensate is prepared, preferably by heating the reagents at between 120° and 250° C. until the amount of water eliminated is of the order of 0.9 to 1.5 mols per mol of dianhydride. After removing the excess phenol, the pre-polycondensate, in the form of a powder or solution, can be shaped to produce various articles. In a second stage, the curing of the pre-polycondensate can be brought about by heating to temperatures of the order of 200° to 400° C., where appropriate as benzene.

Finally, it is also stated that before the final heating, a curing agent such as a polyamine can be added to the pre-polycondensate, particularly when the curing agent is added to a solution of a pre-polycondensate.

The present invention relates to a process for the preparation of powders of thermosetting polycondensates, which are especially suitable for compression moulding, from a pre-polycondensate of azophthalic anhydride and a mono-hydroxyaromatic or polyhydroxyaromatic compound.

Accordingly, the present invention provides a process for preparing a thermosetting polycondensate which comprises heating a pre-polycondensate, of azophthalic anhydride and a mono- or polyhydroxyaromatic compound, in a finely divided state which a diprimary aromatic or heterocyclic aromatic diamine in, as diluent, at least one ortho-phosphate of the general formula:

$$O=P\begin{matrix}OAr_1\\OAr_2\\OR_2\end{matrix}$$

in which each of $Ar_1$ and $Ar_2$, which may be the same or different, represents a phenyl, tolyl or xylyl radical and $R_2$ is as defined for $Ar_1$ or represents an alkyl or chloroalkyl radical of 1 to 8 carbon atoms, at a temperature between 200 and 320° C. The powder obtained can be isolated in a conventional manner.

The starting pre-polycondensates can be prepared as described in French Pat. No. 1,540,984. Among the hydroxyaromatic compound which can be used for forming the prepolycondensates, phenol, the cresols, pyrocatechol, resorcinol, hydroquinone, anthrahydroquinone, 1,2,3-, 1,3,5- and 1,2,4 - trihydroxybenzenes, trimethylolphenol, the naphtols, the dihydroxybiphenyls, bis-(4-hydroxyphenyl)-methane, and bis-2,2-(p-hydroxyphenyl)propane are especially suitable. Of the prepolycondensates prepared as described in French Pat. No. 1,540,984, those obtained by using a molar ratio of hydroxyaromatic compound to dianhydride from 1.5 to 5 and heating the mixture at between 150° and 220° C. until 0.9 to 1.2 mols of water have been eliminated per mol of dianhydride, are preferred. The uncombined hydroxyaromatic compound can be removed by distillation under reduced pressure; it is also possible to dissolve the residual mixture, at least partially, for example in acetone, and then to precipitate the pre-polycondensate with the aid of a hydrocarbon such as cyclohexane; if steps are taken to carry out this precipitation with efficient stirring, the pre-polycondensate can be obtained directly in a finely divided state. It is particularly advantageous to use pre-polycondensates in which at least about 50% of the particles have an average diameter of less than 100μ.

As di-primary diamines which can be used as curing agents, there should more particularly be mentioned those having the general formula:

$$H_2N-A-NH_2 \qquad (III)$$

in which A represents a radical of formula:

[Structures: phenylene, and biphenylene/pyridyl variants] or or represents several phenylene radicals joined to one another by a simple valency bond or by an inert atom or group such as —O—, —S—, an alkylene group with 1 to 3 carbon atoms, —CO—, —SO$_2$—, —NR$_1$—, —N=N—, —CONH—, —COO—, —P(O)R$_1$—,

—CONH—X—NHCO—,

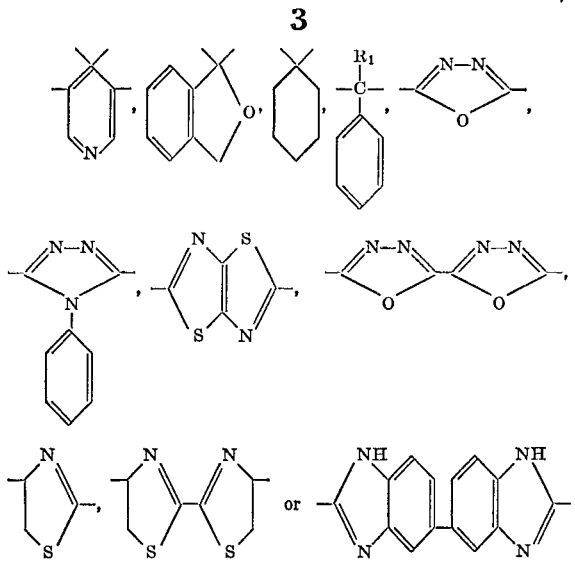

in which $R_1$ represents a hydrogen atom or an alkyl radical of 1 to 4 carbon atoms or a phenyl or cyclohexyl radical, and X represents an alkylene radical having less than 13 carbon atoms. These compounds should be free from substituents which interfere with the polycondensation.

Examples of di-primary diamines which can be used include 2,6-diaminolpyridine,
meta-phenylenediamine,
para-phenylenediamine,
4,4'-diaminodiphenylmethane,
2,2-bis(4-aminophenyl)-propane,
benzidine,
4,4'-diaminophenyl ether,
4,4'-diaminophenyl sulphide,
4,4'-diamino-diphenylsulphone,
bis(4-aminophenyl)methylphosphine oxide,
bis(4-aminophenyl)phenylphosphine oxide,
N,N-bis(4-aminophenyl)methylamine,
1,5-diaminonaphthalene,
1,1-bis(para-aminophenyl)-phthalane,
6,6'-diamino-2,2'-dipyridyl,
4,4'-diamino-benzophenone,
4,4'-diamino-azobenzene,
bis(4-aminophenyl)phenylmethane,
1,1-bis(4-aminophenyl)-cyclohexane,
1,1-bis(4-amino-3-methylphenyl)-cyclohexane,
2,5-bis(m-aminophenyl)-1,3,4-oxadiazole,
2,5-bis(p-aminophenyl)-1,3,4-oxadiazole,
2,5-bis(m-aminophenyl)-thiazolo(4,5-d)thiazole,
5,5'-di(m-aminophenyl)-(2,2')-bis(1,3,4-oxadiazolyl),
4,4'-bis(p-aminophenyl)-2,2'-diathiazole,
m-bis(4-p-aminophenyl)-2-thiazolyl-benzene,
2,2'-bis(m-aminophenyl)-5,5'-dibenzimidazole,
4,4'-diaminobenzanilides,
phenyl 4,4'-diaminobenzoate,
N,N'-bis(4-aminobenzoyl)-p-phenylenediamine,
3,5-bis(m-aminophenyl)-4-phenyl-1,2,4-triazole,
N,N'-bis(p-amino-benzoyl)-4,4'-diaminodiphenylmethane,
bis-p-(4-aminophenoxycarbonyl)benzene,
bis-p-(4-aminophenoxy)benzene,
1,1-bis-p-(4-aminophenyl)-1-phenylethane and
3,5-bis(4-aminophenyl)-pyridine.

Diamines such as m-phenylenediamine, p-phenylenediamine, bis(4-aminophenyl)methane, and bis(4-aminophenyl)ether are particularly advantageous to use.

In practice, from 10% to 40% by weight of diamine, based on the weight of pre-polycondensate is preferably used.

In accordance with a preferred aspect of this invention, the pre-polycondensate and the diamine are heated at between 240° and 280° C. in an ortho-phosphate of Formula II, such as triphenyl ortho-phosphate, monotolyl diphenyl ortho-phosphate, tritolyl ortho-phosphate, trixylyl ortho-phosphate, 2-ethyl-hexyl diphenyl ortho-phosphate or 2-chloroethyl ditolyl ortho-phosphate. The ortho-phosphates of Formula II can be used in the form of mixtures, especially the commercial mixtures usually described by the name of "tricresyl phosphate"; these are generally isomeric mixtures of general formula: $(CH_3C_6H_4O)_3PO$.

The amounts of diluent usually employed represent, by weight, from 1.25 to 5 times the weight of the combination of pre-polycondensate+diamine.

To carry out the process, the mixture comprising the diluent, the pre-polycondensate and the diamine is heated to the chosen temperature; it is preferable to stir it efficiently when the diluent is in the liquid state, and to avoid it coming into contact with oxygen. The duration of heating can vary to a certain extent depending on the nature of the diamine and the chosen temperature, but as a general rule it is of the order of 30 minutes to several hours. During the operation, water is formed, which can be eliminated from the reaction mixture at the rate at which it is formed, for example by distillation, if appropriate in the form of an azeotrope with a hydrocarbon such as benzene. The solid can then be isolated by filtering the residual mixture and can then be washed, advantageously hot, with an organic solvent which can dissolve the diluent but does not dissolve the polycondensate, or does so only very slightly. For this purpose, it is possible to use products such as hydrocarbons, which may or may not be chlorinated, esters and ketones, having a boiling point less than 120° C.

In general, it is not necessary to remove the diluent retained by the polycondensate after filtration entirely. When the diluent is tricresyl phosphate, powders in which the content, by weight, of the diluent is as high as about 5% can be used directly for moulding purposes.

The process of this invention yields powders which are especially suitable for producing articles by the compression moulding technique. These moulded articles possess excellent mechanical properties both at ordinary temperature and at temperatures of about 250° C. and are remarkably resistant to heat exposure.

The example which follows further illustrates the present invention.

EXAMPLE (a) Preparation of the pre-polycondensate

A mixture containing 644 g. (2 mols) of azophthalic anhydride, 752.8 g. (8 mols) of phenol and 50 cm.³ of benzene was gradually heated to 180° C. in a 2 l. cylindrical Pyress glass vessel equipped with a stirrer and a distillation column, and surmounted by a Dean and Stark separator, the water formed being simultaneously eliminated in the form of the binary water-benzene azeotrope. The mixture was then kept at 180° C. for 4 hours, at the end of which 36.5 g. of water had been collected.

The mixture was then allowed to cool to 80° C. and 1300 cm.³ of acetone were then added with stirring. The mixture thus obtained was thereafter run into 5 litres of cyclohexane previously heated to 50° C. and kept vigorously stirred. After cooling, the pre-polycondensate which had precipitated was filtered off and then washed 5 times, each time using 1 litre of an acetone-cyclohexane mixture containing 10% by volume of acetone.

The pre-polycondensate was then dried at 50° C. for 2 hours and then at 80° C. for 5 hours under a reduced pressure of 400 mm. of mercury. 855 g. of a pre-polycondensate were obtained; about 70% of the particles thereof had a diameter of less than 50µ.

(b) Production of the powder

A mixture consisting of 160 g. of the pre-polycondensate obtained above, 40 g. of bis(4-aminophenyl)methane and 400 g. of tricresyl phosphate was gradually heated to 250° C. over 45 minutes, whilst stirring, in the same, equipped, cylindrical vessel.

The mixture was then allowed to cool to 80° C. whilst stirring, and 400 cm.³ of acetone was rapidly added, after which the stirring was continued for 30 minutes.

The suspension thus obtained was filtered and the solid obtained added to 200 cm.³ of acetone, and the whole was stirred vigorously for several minutes and again filtered. The solid was washed twice with 250 cm.³ of acetone and then washed continuously with boiling acetone for 2 hours. After drying, 178 g. of a powder containing about 7 g. of tricresyl phosphate were obtained.

(c) Production of a moulded article 8.5 g. of the powder obtained in (b) were introduced into a cylindrical mould (diameter=50 mm.), and the whole was then placed between the platens of a press previously heated to 310° C. When heat equilibrium had been established, a pressure of 200 kg./cm.² was applied between the platens, and the whole was kept under these conditions for 20 minutes.

The article was released from the mould whilst hot and subjected to a supplementary heat treatment in a nitrogen atmosphere under the following conditions: 20 hours at 300° C., followed by 20 hours at 320° C., followed by 5 hours at 340° C.

This process was repeated several times and parallel piped specimens (30 x 8 x 3 mm.) were cut from the discs obtained; on some of these, flexural breaking strength tests are carried out (span=25.4 mm.). The following values were found:

measured at 25°: 16.1 kg./mm.²
measured at 250°: 12.7 kg./mm.².

Other specimens were subjected to heat exposure at 300° C. for 500 hours. After cooling, it was found that the flexural breaking strength, measured at 25° C., was still 14.4 kg./mm.².

We claim:

1. In a process for preparing a thermosetting polycondensate which comprises heating a pre-polycondensate, of azophthalic anhydride and a mono- or polyhydroxyaromatic compound selected from phenol, a cresol, pyrocatechol, resorcinol, hydroquinone, anthrahydroquinone, 1,2,3-, 1,2,4-, and 1,3,5-trihydroxybenzene, trimethylol-phenol, a naphthol, a dihydroxy diphenyl, bis(4-hydroxyphenyl)methane and bis-2,2-(p-hydroxy-phenyl)propane, obtained by heating, at a temperature between 150° and 220° C., 1,5 to 5 moles of the hydroxyaromatic compound per mole of azophthalic anhydride until 0.9 to 1.2 moles of water per mole of azophthalic anhydride have been eliminated, in a finely divided state with a diprimary aromatic diamine having the general formula:

$$H_2N-A-NH_2$$

in which A represents a radical of the formula:

or represents several phenylene radicals joined to one another by a simple valency bond or by an inert atom or group, in an amount from 10 to 40% by weight based on the pre-polycondensate, the improvement which comprises carrying out the heating in at least one orthophosphate of the general formula:

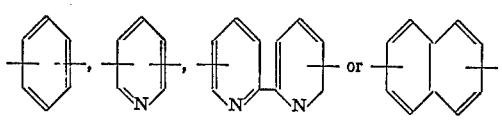

in which each of $Ar_1$ and $Ar_2$, which may be the same or different, represents a phenyl, tolyl or xylyl radical and $R_2$ is as defined for $Ar_1$ or represents an alkyl or chloroalkyl radical of 1 to 8 carbon atoms, as diluent, in an amount from 1.25 to 5 times the combined weight of pre-polycondensate and diamine, at a temperature between 200 and 320° C.

2. A process according to claim 1 wherein the orthophosphate is triphenyl, monotolyl diphenyl, tritolyl, trixylyl, 2-ethyl-hexyl diphenyl or 2-chloroethyl ditolyl ortho-phosphate.

3. A process according to claim 1 wherein the orthophosphate is tricresyl phosphate.

4. In a process for preparing a thermosetting polycondensate which comprises heating a pre-polycondensate, of azophthalic anhydride and a mono- or polyhydroxyaromatic compound selected from phenol, a cresol, pyrocatechol, resorcinol, hydroquinone, anthrahydroquinone, 1,2,3-, 1,2,4-, and 1,3,5-trihydroxybenzene, trimethylol-phenol, a naphthol, a dihydroxy diphenyl, bis-(4-hydroxyphenyl)methane and bis - 2,2 - (p - hydroxyphenyl)propane, obtained by heating, at a temperature between 150° and 220° C., 1.5 to 5 moles of the hydroxyaromatic compound per mole of azophthalic anhydride until 0.9 to 1.2 moles of water per mole of azophthalic anhydride have been eliminated, in a finely divided state with a diprimary aromatic diamine having the general formula:

$$H_2N-A-NH_2$$

in which A represents a radical of the formula:

or represents several phenylene radicals joined to one another by a simple valency bond or by an inert atom or group, of the formula: —O—, —S—, an alkylene group of 1 to 3 carbon atoms, —CO—, —SO$_2$—, —NR$_1$—, —N=N—, —CONH—, —COO—, —P(O)R$_1$—, —CONH—X—NHCO—,

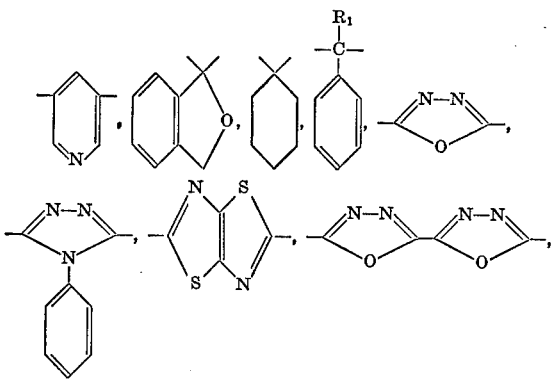

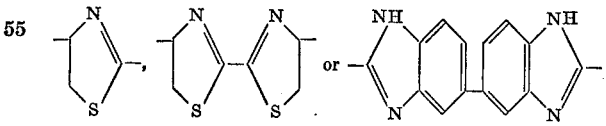

in which $R_1$ represents hydrogen, an alkyl radical of 1 to 4 carbon atoms, a phenyl or a cyclohexyl radical and X represents an alkylene radical of less than 13 carbon atoms, in an amount from 10 to 40% by weight based on the pre-polycondensate, the improvement which comprises carrying out the heating in at least one orthophosphate of the general formula:

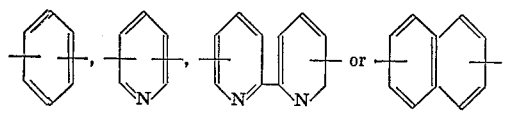

in which each of $Ar_1$ and $Ar_2$, which may be the same or different, represents a phenyl, tolyl or xylyl radical and $R_2$ is as defined for $Ar_1$ or represents an alkyl or chloroalkyl radical of 1 to 8 carbon atoms, as diluent, in an amount from 1.25 to 5 times the combined weight of pre-polycondensate and diamine, at a temperature between 200 and 320° C.

5. A process according to claim 4, wherein the diprimary diamine is m-phenylenediamine, p-phenylenediamine, bis(4 - aminophenyl)methane or bis(4 - aminophenyl)ether.

6. A process according to claim 1 wherein the pre-polycondensate and diamine are heated at a temperature between 240° and 280° C.

7. A process according to claim 1 wherein at least 50% of the pre-polycondensate has an average particle diameter of less than 100µ.

8. A process according to claim 1 wherein the monohydroxyaromatic compound is phenol.

References Cited
UNITED STATES PATENTS

| | | | |
|---|---|---|---|
| 3,441,538 | 4/1969 | Marks | 260—49 |
| 3,442,857 | 5/1969 | Thornton | 260—47 |

FOREIGN PATENTS

| | | | |
|---|---|---|---|
| 1,540,984 | 10/1969 | France | 260—47 CP |

HAROLD D. ANDERSON, Primary Examiner

L. L. LEE, Assistant Examiner

U.S. Cl. X.R.

260—30.6 R, 37 N, 40 R, 49; 264—331